L. KIRK,

Assignor to W. F. BROWN.

Hay and Straw Press.

No. 9,350. Reissued Aug. 24, 1880.

Witnesses,

W. A. Bertram

Dr. L. H. Barclay.

Inventor

Lewis Kirk.

by

R. D. Williams.

Attorney.

UNITED STATES PATENT OFFICE.

LEWIS KIRK, OF RISING SUN, ASSIGNOR TO WILLIAM T. BROWN, OF CATONSVILLE, MARYLAND.

HAY AND STRAW PRESS.

SPECIFICATION forming part of Reissued Letters Patent No. 9,350, dated August 24, 1880.

Original No. 164,922, dated June 29, 1875. Application for reissue filed April 27, 1880.

*To all whom it may concern:*

Be it known that I, LEWIS KIRK, of Rising Sun, Cecil county, State of Maryland, have invented certain new and useful Improvements in Hay and Straw Presses; and I hereby declare the same to be fully, clearly, and exactly described as follows, reference being had to the accompanying drawings, in which—

Figure 1:
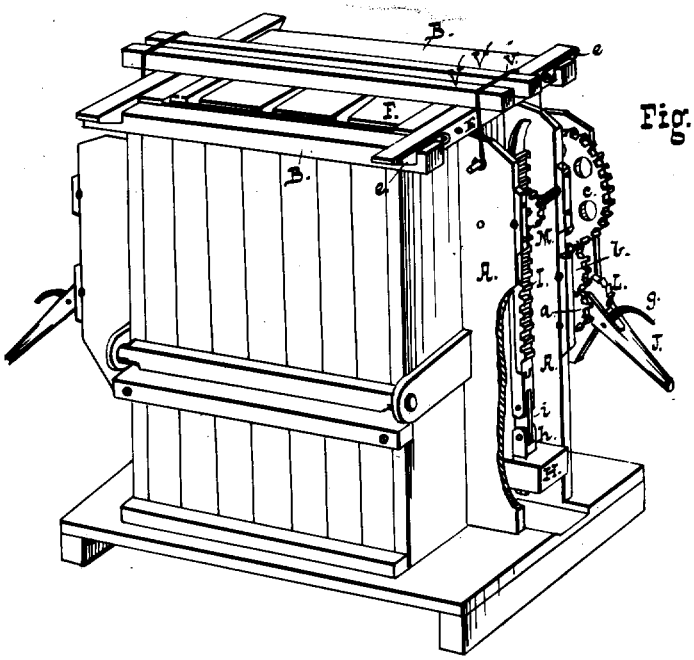
Figure 2:
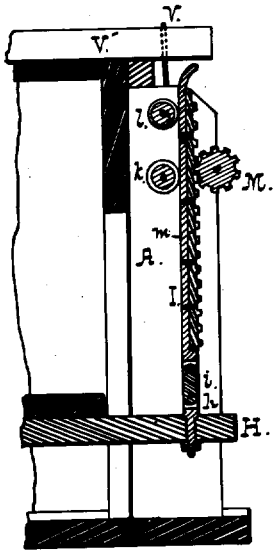
Figure 3:
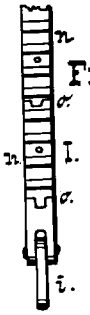

Figure 1 is a perspective view of the press. Fig. 2 is a central sectional view of one end of the same, and Fig. 3 represents one of the rack-bars and its link detached from the press.

My invention relates, first, to a combination of parts whereby the follower is lifted by a downward motion of the lever, and the strain and wear are equalized, as hereinafter set forth.

It further relates to the rack-bar composed of a wrought-iron back to withstand strain, and of short cast-iron sections of cogs having interlocked joints, and also to certain details of construction and combinations of parts, as hereinafter set forth.

The press, as shown in Fig. 1, is furnished with the usual appliances for charging it with the material to be baled, the pressure being applied through a follower or platen, which rests on a beam, H, the material being compressed between the follower and the top plate, F, of the press. At either end of the press is a train of gears, *a b c* M, and a lever, ratchet, and pawl arrangement, J *g* L, through or by means of which the power is applied to the platen or follower. Other means of generating and applying power or other arrangements of gears, levers, or cranks may be used. At each end of the beam H is a lug, *h*, to which is pivoted one end of a link-plate, *i*, the other end thereof being pivoted to the lower end of the rack-bar I, so that by this double pivot joint or connection the platen may swing in the line of its length in either direction, and the rack-bars (there being one at each end of the press) may swing in the same plane, but not out of it, as would be the case were the connections made of chain-links instead of plates *i*. The object of this construction is to relieve the press of undue strain at one of its ends, it being almost impossible to make the two rack-bars move exactly alike and to prevent breaking the parts. The rack-bars are held in gear with the pinions M by means of friction-rolls *k l* behind them, but which do not prevent a slight but sufficient swaying motion at the lower ends of the rack-bars.

The back pieces, *m*, of the rack-bars I are made of wrought-iron, so as to stand the strain without breaking, and to this wrought-iron bar are fastened short cog-sections *n n*, having interlocked ends *o o* to keep them in line, and admitting of the replacement by a new one of a section in which a cog breaks.

The sides of the press are provided with the usual doors to gain access to the interior, the said doors having cross-beams B B, which are held by catches *e e* on the transverse beams E of the press.

The top plate, F, is furnished with one or more longitudinal beams, V′ V′, which are secured by links V, pivoted to the bars A A at the ends of the press.

I am aware that a single-joint connection between the rack-bars and platen, and also that a common chain-connection between the same, are old, and such I do not claim.

What I do claim is—

1. In combination with the press-body having uprights A and links V, securing the top beams of the press, the rack I, ratchet-wheel L, pivoted lever J and pawl, and intermediate gearing, whereby a downward motion of the lever lifts the rack-bar and follower, substantially as described.

2. In combination with the press, the rack-bars I, composed of wrought-iron back *m* and cast-iron cog-sections *n*, secured thereto and having interlocking ends *o*, as described.

Witness my hand this 9th day of December, 1878.

LEWIS KIRK.

Witnesses:

R. D. WILLIAMS,

W. A. BERTRAM.